W. A. CRAMMOND.
FLEXIBLE PIPE COUPLING.
APPLICATION FILED JUNE 16, 1910.

1,006,830.

Patented Oct. 24, 1911.

WITNESSES:
John a Bergstrom
C. W. Fairbanks

INVENTOR
William Alexander Crammond
BY Munn & Co
ATTORNEYS

UNITED STATES PATENT OFFICE.

WILLIAM ALEXANDER CRAMMOND, OF NEW YORK, N. Y.

FLEXIBLE PIPE-COUPLING.

1,006,830.	Specification of Letters Patent.	Patented Oct. 24, 1911.

Application filed June 16, 1910. Serial No. 567,135.

*To all whom it may concern:*

Be it known that I, WILLIAM ALEXANDER CRAMMOND, a citizen of the United States, and a resident of the city of New York, borough of Manhattan, in the county and State of New York, have invented a certain new and useful Flexible Pipe-Coupling, of which the following is a full, clear, and exact description.

This invention relates to certain improvements in flexible pipe couplings for use generally in connecting relatively-movable pipes through which a fluid is delivered, the special form of coupling being especially designed for use in connecting steam pipes, which carry the steam to multiple waterseal cups of telescopic gas holders, to prevent the freezing of the water within the cups during the winter.

One further object of my invention is to so construct the parts of the pipe coupling that friction is reduced to a minimum and leakage is effectively prevented.

A further object of my invention is to strengthen the pipe at the ends of the latter, which connect to the joint, so that during the lateral movement of the pipes in the bending of the joint, the liability of breaking the pipe is materially reduced.

In my improved coupling I provide male and female members relatively rotatable, and prevented from relative longitudinal movement by a fastening device, which holds the male member against a seat. The female member carries a packing which prevents leakage, and which is unaffected by wear or longitudinal adjustment of one member in respect to the other. I further provide the members with reinforcing sleeves extending beyond the threaded sockets which receive the pipes, so that these sleeves reinforce the pipes, and prevent them from breaking at the end of the thread where the pipe is ordinarily weakest.

The invention consists in the combination and arrangement of parts hereinafter defined in the claims.

Reference is to be had to the accompanying drawings, forming a part of this specification, in which similar characters of reference indicate corresponding parts in both the views, and in which—

Figure 1:
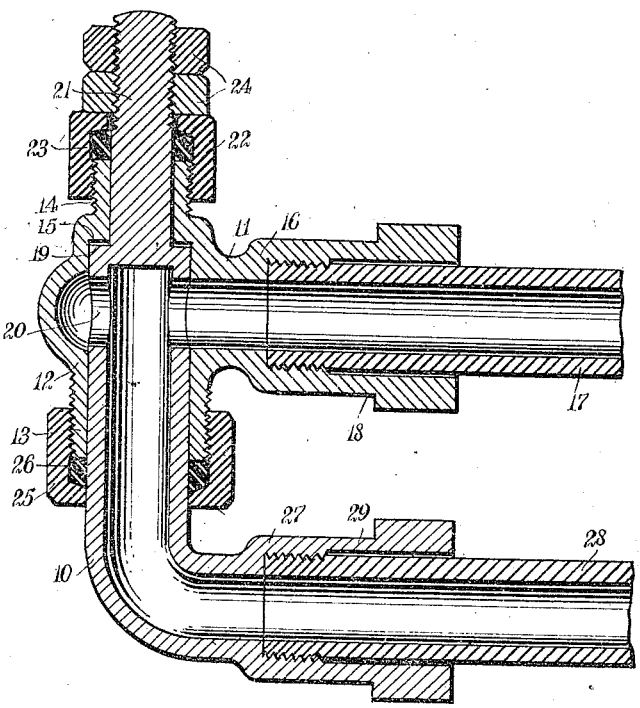
Figure 2:
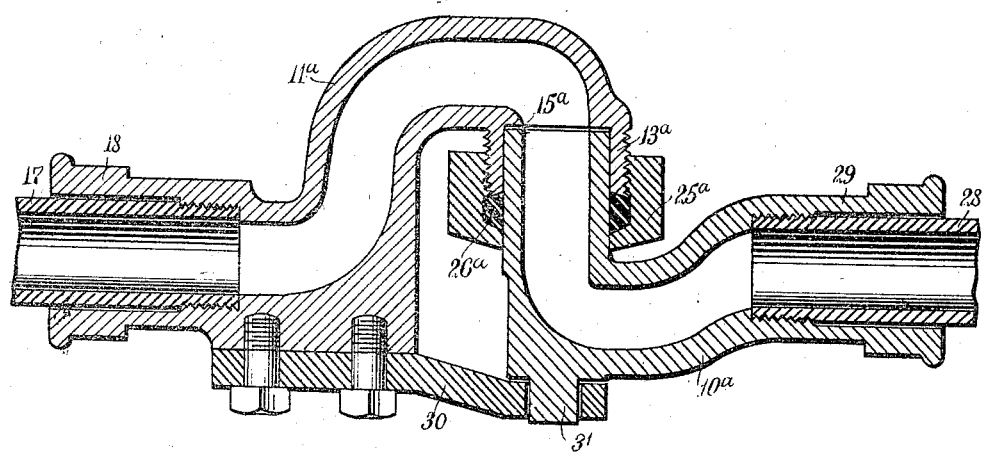

Figure 1 is a longitudinal section through a coupling constructed in accordance with my invention; and Fig. 2 is a longitudinal section through a second form which my invention may assume.

In the specific form of coupling illustrated in Fig. 1, I provide male and female members 10 and 11, each of which is adapted for the connection of a pipe thereto. The female member 11 has a tubular body portion 12, terminating in a threaded extension 13 at one end and a threaded extension 14 at the opposite end. Adjacent the end 14 is an inwardly facing seat 15, the function of which will be set forth more fully hereinafter. Extending laterally from the side of the body 12 is a nipple 16 presenting an interiorly threaded socket into which a pipe 17 may be screwed. The nipple has a sleeve 18 extending beyond the threaded portion and of such size as to closely fit the exterior of the pipe 17.

The male member 10 is substantially L-shaped, and the tubular body of one branch fits within the tubular body 12 and presents a shoulder 19 for engagement with the seat 15. This body portion is hollow down approximately to the shoulder, and is provided with ports 20 in the walls thereof opposite to the nipple 16, and through which the interior of the nipple may communicate with the interior of the member 10. Beyond the shoulder 19 the member 10 has an extension 21 leading through the threaded extension 14 of the body 12, and closely fitting the same. Beyond the end of the threaded extension 14 the extension 21 is provided with a gland 22, for holding a packing gasket 23 in engagement with the end of the extension 14, the gland is unattached to the extension 21 but is held in place by suitable jam nuts 24 for preventing the accidental loosening of the gland 22. Surrounding the body portion of the member 10 is a second gland 25, which holds a gasket 26 in engagement with the end of the threaded extension 13 so as to prevent leakage of the fluid along the body 10 and through the extension 13. The member 10 has one leg or portion thereof constituting a nipple 27, similar to the nipple 16; that is, it is interiorly threaded to receive a pipe 28, and has a sleeve encircling the pipe beyond the threaded portion of the latter.

It will be noted that the member 11 is free to swing through a complete revolution in respect to the member 10, and that the gland 22 holds the member 10 firmly against it to seat in the latter. The packings at opposite ends of the member 11 prevent any leakage along the exterior of the member 10, in either direction, and these packings are neither tightened nor loosened during a rotation of one member in respect to the other. There is very little friction and very little liability to leakage, as when the inner member becomes worn the gland 22 may be tightened to draw the shoulder closer against the seat. The turning of one member in respect to the other by a relative movement of the pipes exerts a strain at the end of the threaded portion, where the pipe is the weakest, but by means of the sleeves 18 and 29 the pipes are reinforced at their weak points, and the pipes are thus prevented from being broken at the threads during a turning movement.

It is not essential that the male member should extend entirely through the female member, as illustrated in Fig. 1. I may, if desired, construct the device as illustrated in Fig. 2, in which device the male member 10$^a$ has its open inner end constituting a shoulder, and engaging with a seat 15$^a$, within the threaded extension 13$^a$ of the female member 11$^a$. In this form only one gland 25$^a$ and one gasket 26$^a$ need be employed. The male member is held in engagement with its seat member by a bracket 30 bolted or otherwise rigidly secured to the female member 11$^a$, and receiving a stud or projection 31 on the male member in alinement with the axis of rotation of the said member. Even though the male member does not fit closely against its seat, and even though the parts become greatly worn, yet the gasket 26$^a$ will prevent any leakage, as the gland 25$^a$ may be continually tightened.

The form shown in Fig. 2 possesses one advantage in that the two pipes 28 and 17 are in alinement with each other, whereas the pipes shown in Fig. 1 are out of alinement. Of course, the joint shown in Fig. 2 is not capable of a complete revolution, though it permits of a revolution through approximately 270°. The two members in this form have the same sleeves 18 and 29 for reinforcing the pipes.

Having thus described my invention, I claim as new and desire to secure by Letters Patent:

1. A flexible pipe coupling including a member having a seat upon the interior thereof, an externally threaded extension beyond said seat, a threaded nipple, a second member having a rotatable portion extending into said first-mentioned member and engaging at said seat, a gland secured about said threaded extension and encircling said second-mentioned member, and means in engagement with said second-mentioned member in axial alinement with said rotatable portion thereof, for preventing movement of said member away from said end, said second-mentioned member having a threaded nipple.

2. A flexible pipe coupling including a member having a seat upon the interior thereof, a threaded extension beyond the same, an interiorly-threaded nipple, terminating in a flange beyond the threads thereof, a second member having a rotatable portion extending into the first-mentioned member and engaging with said seat, a gland secured about said threaded extension and encircling said second-mentioned member, and means in engagement with the second-mentioned member in axial alinement with said rotatable portion thereof, for preventing movement of said member away from said end, said second-mentioned member having an interiorly threaded nipple terminating in a flange, extending beyond the threads thereof.

In testimony whereof I have signed my name to this specification in the presence of two subscribing witnesses.

WILLIAM ALEXANDER CRAMMOND.

Witnesses:
 HUGH M. DEAN,
 GEO. H. MILLER.